(12) United States Patent
Roberts

(10) Patent No.: US 7,735,603 B2
(45) Date of Patent: Jun. 15, 2010

(54) NOISE REDUCING DEVICE FOR A PNEUMATIC TOOL

(75) Inventor: Neil James Roberts, Gauteng (ZA)

(73) Assignee: Longyear TM, Inc., South Jordan, UT (US)

( * ) Notice: Subject to any disclaimer, the term of this patent is extended or adjusted under 35 U.S.C. 154(b) by 0 days.

(21) Appl. No.: 12/128,166

(22) Filed: May 28, 2008

(65) Prior Publication Data

US 2009/0294211 A1 Dec. 3, 2009

(51) Int. Cl.
*F01N 1/08* (2006.01)
*F01N 1/02* (2006.01)

(52) U.S. Cl. ................................. 181/230; 181/274
(58) Field of Classification Search ............... 181/230, 181/274, 249, 255; 173/DIG. 2, 219
See application file for complete search history.

(56) References Cited

U.S. PATENT DOCUMENTS

| | | | | |
|---|---|---|---|---|
| 172,245 | A * | 1/1876 | Butler | 181/274 |
| 706,844 | A | 8/1902 | Motsinger | |
| 888,489 | A | 5/1908 | Gustafson | |
| 969,101 | A * | 8/1910 | Gibson | 181/279 |
| 1,338,520 | A | 4/1920 | Moores | |
| 1,373,221 | A | 3/1921 | Blackburn | |
| 1,468,398 | A | 9/1923 | Reed | |
| 1,644,794 | A * | 10/1927 | Saharoff | 181/255 |
| 1,760,682 | A * | 5/1930 | Boysen | 181/274 |
| 1,838,834 | A | 12/1931 | Holzer | |
| 2,037,102 | A * | 4/1936 | Vipond | 181/255 |
| 2,054,956 | A | 9/1936 | St. Stephens | |
| 2,057,304 | A * | 10/1936 | Saint-Jacques | 181/274 |
| 2,128,742 | A | 8/1938 | Fuehrer | |
| 2,139,736 | A * | 12/1938 | Durham | 181/274 |
| 2,170,704 | A * | 8/1939 | Bourne | 55/392 |
| 2,274,460 | A | 2/1942 | Rauen | |
| 2,512,823 | A * | 6/1950 | Blundell | 181/255 |
| 2,562,101 | A * | 7/1951 | Hoyle | 181/255 |
| 2,660,257 | A | 11/1953 | Bourne et al. | |
| 2,764,250 | A | 9/1956 | Jeffords | |
| 2,936,844 | A * | 5/1960 | Gill | 181/231 |
| 3,066,755 | A * | 12/1962 | Diehl | 181/279 |
| 3,166,152 | A * | 1/1965 | Conlin | 181/274 |
| 3,176,791 | A | 4/1965 | Betts | |
| 3,243,011 | A * | 3/1966 | Hill | 181/274 |
| 3,255,844 | A | 6/1966 | Wallace | |

(Continued)

FOREIGN PATENT DOCUMENTS

DE 3125083 A1 1/1983

(Continued)

OTHER PUBLICATIONS

U.S. Appl. No. 12/169,514, filed Jul. 8, 2008, Roberts.

(Continued)

*Primary Examiner*—Edgardo San Martin
(74) *Attorney, Agent, or Firm*—Workman Nydegger

(57) ABSTRACT

A noise reducing device includes a housing defining an expansion chamber therein and having a longitudinal axis along the length of the expansion chamber and a tool port in fluid communication with the expansion chamber, the tool port being oriented transversely relative to the longitudinal axis so as to cause fluid directed from the tool port to the expansion chamber to whirl about the expansion chamber.

23 Claims, 6 Drawing Sheets

U.S. PATENT DOCUMENTS

| | | | |
|---|---|---|---|
| 3,311,120 A | | 3/1967 | Palmisano |
| 3,323,614 A | * | 6/1967 | Thrasher ................... 181/274 |
| 3,340,958 A | * | 9/1967 | Conlin ..................... 181/274 |
| 3,365,022 A | | 1/1968 | Barber et al. |
| 3,530,953 A | * | 9/1970 | Conlin ..................... 181/274 |
| 3,554,316 A | | 1/1971 | Judd et al. |
| 3,577,728 A | * | 5/1971 | Von Brimer et al. .......... 60/283 |
| 3,599,756 A | | 8/1971 | Pickle |
| 3,635,299 A | | 1/1972 | Hayes |
| 3,688,868 A | | 9/1972 | Gibel |
| 3,750,841 A | * | 8/1973 | Brown ...................... 181/274 |
| 3,776,366 A | | 12/1973 | Betts et al. |
| 3,815,705 A | | 6/1974 | Bennett |
| 3,898,064 A | | 8/1975 | Tao et al. |
| 3,907,528 A | * | 9/1975 | Halter ........................ 96/385 |
| 3,927,525 A | * | 12/1975 | Jacobs ......................... 60/301 |
| 3,927,731 A | * | 12/1975 | Lancaster .................. 181/238 |
| 3,941,206 A | * | 3/1976 | Halter ........................ 181/256 |
| 3,957,446 A | * | 5/1976 | Mayer et al. ................ 422/168 |
| 3,981,378 A | | 9/1976 | Potter |
| 3,995,712 A | | 12/1976 | Leistritz et al. |
| 4,010,819 A | | 3/1977 | Ekstrom et al. |
| 4,027,740 A | | 6/1977 | Martin |
| 4,028,076 A | * | 6/1977 | Fields ......................... 55/394 |
| 4,079,809 A | | 3/1978 | Visnapuu et al. |
| 4,082,160 A | | 4/1978 | Schilling et al. |
| 4,109,749 A | | 8/1978 | Sweet |
| 4,113,052 A | | 9/1978 | McElroy et al. |
| 4,135,602 A | | 1/1979 | Clark |
| 4,244,442 A | | 1/1981 | Scarton et al. |
| 4,294,330 A | | 10/1981 | Baldwin et al. |
| 4,303,133 A | | 12/1981 | Godolphin |
| 4,327,817 A | | 5/1982 | Scarton et al. |
| 4,346,783 A | | 8/1982 | Scarton et al. |
| 4,402,383 A | | 9/1983 | Bailey |
| 4,424,882 A | | 1/1984 | Moller |
| 4,474,260 A | | 10/1984 | Valentine |
| 4,496,023 A | | 1/1985 | Lindberg et al. |
| 4,558,763 A | | 12/1985 | Montabert |
| 4,565,259 A | | 1/1986 | Stoll |
| 4,624,339 A | | 11/1986 | Marcel et al. |
| 4,880,078 A | * | 11/1989 | Inoue et al. .................. 181/232 |
| 5,152,366 A | | 10/1992 | Reitz |
| 5,214,253 A | | 5/1993 | Houston, Jr. |
| 5,214,254 A | | 5/1993 | Sheehan |
| 5,373,119 A | | 12/1994 | Suzuki et al. |
| 5,376,762 A | | 12/1994 | Kimberlin |
| 5,545,860 A | * | 8/1996 | Wilkes et al. ............... 181/255 |
| 5,581,055 A | | 12/1996 | Self et al. |
| 5,729,973 A | * | 3/1998 | Zander et al. ................ 60/302 |
| 5,731,556 A | | 3/1998 | Gardner et al. |
| 5,844,178 A | * | 12/1998 | Lothringen ................ 181/269 |
| 5,952,623 A | | 9/1999 | Sterling |
| 6,199,656 B1 | | 3/2001 | Vento et al. |
| 6,382,348 B1 | * | 5/2002 | Chen ......................... 181/239 |
| 6,457,551 B1 | | 10/2002 | Chang |
| 6,576,028 B2 | | 6/2003 | Santos |
| 6,668,971 B2 | | 12/2003 | Sterling |
| 6,679,351 B2 | | 1/2004 | Cummings et al. |
| 6,892,853 B2 | * | 5/2005 | Cai et al. .................... 181/249 |
| 6,959,782 B2 | * | 11/2005 | Brower et al. ............... 181/272 |
| 7,040,451 B2 | * | 5/2006 | Schumacher et al. ........ 181/254 |
| 7,052,247 B2 | * | 5/2006 | Lee ............................ 417/312 |
| 7,191,868 B2 | | 3/2007 | Craig et al. |
| 7,216,739 B2 | | 5/2007 | Sterling |
| 2006/0037811 A1 | * | 2/2006 | Kensok et al. ............. 181/249 |
| 2009/0090530 A1 | * | 4/2009 | Roberts et al. ............. 173/219 |

FOREIGN PATENT DOCUMENTS

| | | |
|---|---|---|
| JP | 53-28503 | 3/1978 |
| JP | 57-148013 | 9/1982 |
| JP | 59-126118 | 8/1984 |
| JP | 60-98711 | 7/1985 |
| JP | 07-248090 | 9/1995 |
| JP | 2006-194157 | 7/2006 |
| WO | 03/009974 | 2/2003 |

OTHER PUBLICATIONS

International Search Report mailed Jun. 23, 2009 from PCT Application No. PCT/US08/087637 (3 pages).

International Search Report mailed Jan. 5, 2009 from PCT Application No. PCT/US08/069992 (3 pages).

Office Action from U.S. Appl. No. 12/169,514 dated Sep. 25, 2009 (10 pages).

Notice of Allowance dated Dec. 29, 2009 from U.S. Appl. No. 12/169,514 (6 pages).

Issue Notification dated Mar. 3, 2010 from U.S. Appl. No. 12/169,514 (1 page).

* cited by examiner

NOISE REDUCING DEVICE FOR A PNEUMATIC TOOL

BACKGROUND OF THE INVENTION

1. The Field of the Invention

This application relates generally to noise reducing devices. In particular, this application discusses noise reducing devices for use with pneumatically operated tools, such as pneumatic percussive drills.

2. The Relevant Technology

The process of converting energy stored in compressed air into motion for powering a pneumatic tool generates a significant amount of noise as the spent air (exhaust) is exhausted. In particular, pneumatic tools are operated by compressed air that enters a sealed chamber, exerts pressure on an internal piston, and causes the piston to move forward and back repeatedly. As spent compressed air is exhausted from the sealed chamber, the compressed air expands rapidly causing a loud noise. Often, the operation of pneumatic tools requires a close proximity between the tool and an operator, and the noise generated by the tool can be loud enough to be potentially harmful the operator.

There are many approaches to reduce the noise from these devices. A common approach is a muffler consisting of an expansion chamber into which the exhaust flows and expands before venting to the atmosphere. Such designs take various geometric shapes including cylindrical, kidney-shaped, and rectangular. Another approach includes incorporating a series of internal chambers within an expansion chamber to allow the exhaust to progressively expand. The series of internal chambers can be made of metal alloys, polymers, composite, elastomeric, or foamed sound-absorbing materials.

While such approaches offer some improvement in noise reduction, they may be very complex and include several intricate parts that must be manufactured and fitted together at a significant cost. Many approaches use bulky devices that can obstruct the mobility and operation of the pneumatic tools with which they are used. Other approaches can restrict air flow and, thereby, result in reduced performance of the pneumatic tool. Additionally, given the close proximity of pneumatic tools and their operators, the noise reduction of current approaches is often insufficient to acceptably reduce the damaging and/or painful noise levels.

The subject matter claimed herein is not limited to embodiments that solve any disadvantages or that operate only in environments such as those described above. Rather, this background is only provided to illustrate one exemplary technology area where some examples described herein may be practiced

BRIEF SUMMARY OF THE INVENTION

A noise reducing device for a pneumatic tool is provided that includes a housing defining a single expansion chamber therein and having a longitudinal axis along the length of the expansion chamber. A tool port is in fluid communication with the expansion chamber, the tool port being oriented transversely relative to the longitudinal axis in such a manner as to cause fluid directed from the tool port to the expansion chamber to whirl about the expansion chamber as the fluid expands.

The noise reducing device may also include a housing defining an expansion chamber therein and having a longitudinal axis located near a center of the expansion chamber and extending along a length of the expansion chamber. A transverse axis may be located normally to the longitudinal axis. The transverse axis and the longitudinal axis define a first reference plane. The noise reducing device also includes a port outlet in fluid communication with the expansion chamber, the tool port including a port axis located near a center of the tool port and extending along a length of the tool port. The port outlet and the port axis define a port outlet point in which the port outlet point is part of a second reference plane, the second reference plane being parallel to and offset from the first reference plane.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

BRIEF DESCRIPTION OF THE DRAWINGS

To further clarify the above and other advantages and features of the present invention, a more particular description of the invention will be rendered by reference to examples which are illustrated in the appended drawings. It is appreciated that these drawings depict only examples and are therefore not to be considered limiting of its scope. The following description can be better understood in light of the Figures, in which.

Figure 1:
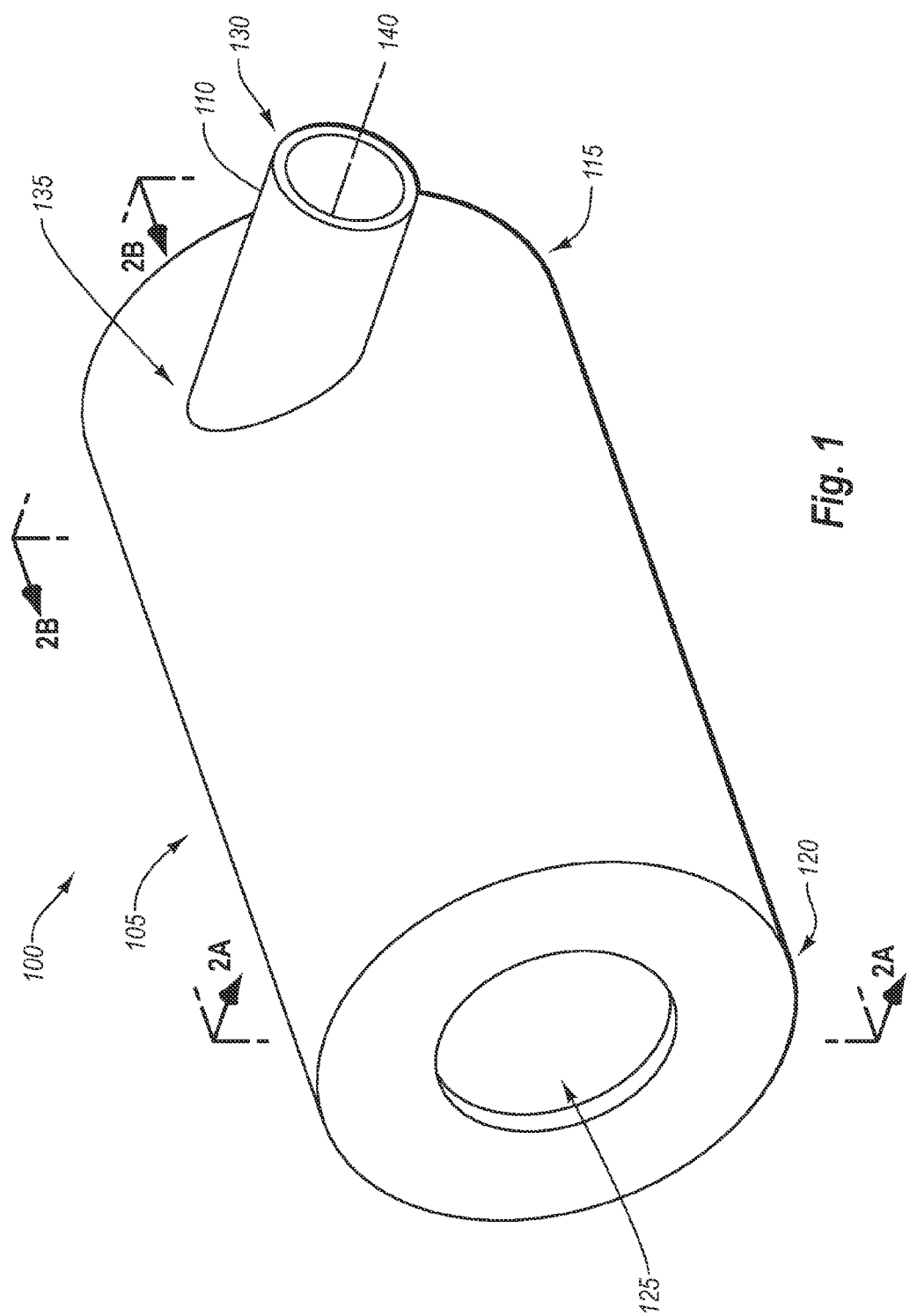
FIG. 1 illustrates a noise reducing device according to one example.

Together with the following description, the Figures demonstrate the features of the noise reducing devices and methods for making and using the noise reducing device. The thickness and configuration of components may be exaggerated in the Figures for clarity. The same reference numerals in different drawings represent the same element.

DETAILED DESCRIPTION OF THE PREFERRED EMBODIMENTS

A noise reducing device is provided herein for reducing noise associated with exhausting air during the operation of pneumatic tools. In at least one example, the noise reducing device includes a housing defining an expansion chamber and a tool port in fluid communication with the expansion chamber. The noise reducing device also includes an outlet that provides fluid communication between the expansion chamber and the atmosphere. As used herein, the term exhaust shall be broadly understood to mean exhausted fluid, such as exhausted air, that passes through the noise reducing device.

Exhaust directed from the tool port to the expansion chamber enters the housing at a port outlet. The travels through the tool port along a port axis that extends generally through the center of and along the length of the tool port. The point at which the port axis and the port outlet meet may be described as a port outlet point. The port outlet point and the port axis are positioned in such a manner that at least a portion of a fluid stream directed from the tool port to the expansion chamber to whirl or eddy in the expansion chamber.

As the exhaust enters the expansion chamber, the exhaust begins to expand as it whirls. As the exhaust whirls through the expansion chamber, the exhaust may spend a relatively long period of time in the expansion chamber, thereby allowing the exhaust to expand over a longer period of time to thereby slowly dissipate some of the energy associated with the exhaust. Further, the interaction of the exhaust with the expansion chamber and any structure within the expansion chamber may further help to slowly dissipate the energy associated with the exhaust. A controlled and/or slowed dissipation of energy in a exhaust may help reduce noise associated with exhausting the exhaust.

In at least one example, the noise reducing device is part of a pneumatic drilling system. It will be appreciated that the noise reducing device and associated systems and methods can be implemented and used without employing these specific details. Indeed, the device and associated systems and methods can be placed into practice by modifying the device and associated systems and methods and can be used in conjunction with any existing apparatus, system, component, and/or technique. For example, while the description below focuses on a noise reducing device used with pneumatically operated percussive drills, the device may be modified for any pneumatically operated tools with a sudden exhaust, such as a blower, a breaker, an impact wrench, or any other type of device. The noise reducing device may also be used with any rapid gas exhaust device, including any suitable safety valve, compressor exhaust, or expanding gas vent.

FIG. 1 illustrates a noise reducing device 100 according to one example. As shown in FIG. 1, the noise reducing device 100 may include a housing 105 and a tool port 110. The housing 105 in turn may include a first end 115 and a second end 120. An outlet 125 is in exhaust communication with the second end 120 of the housing 105. At least a portion of the outlet 125 is located proximate to a longitudinal axis (120, FIG. 2A). In the illustrated example, the outlet 125 includes one or more openings defined in the second end 120.

It will be appreciated that the outlet 125 may include openings that are distributed about some portion of the length of the housing 105 or other configurations that allow the noise reducing device 100 to exhaust air introduced into the housing 105 from the tool port 110. Further, the outlet 125 may be any shape, including circular, ellipsoidal, square, rectangular, polygonal, and combinations of these shapes. Indeed, FIG. 1 shows that the outlet 125 may be substantially circular in some examples. The tool port 110 is located transverse to a longitudinal axis (220, FIG. 2A) in such a manner as to cause exhaust directed from the tool port 110 to the housing 105 to whirl about an expansion chamber formed by the housing 105 as the exhaust is introduced.

The tool port 110 is configured to fluidly couple the housing 105 to a pneumatic tool, such as to a pneumatically-operated percussive drill. For example, the tool port 110 may include a first end 130 and a second end 135. The first end 130 is configured to be fluidly coupled to a pneumatic tool or may be directly coupled to the pneumatic tool. The second end 135 is in fluid communication with the first end 130, which is in fluid communication with the housing 105. As illustrated in FIG. 1, the tool port 110 may be described with reference to a port axis 140 that extends through a center of the tool port 110 along the length of the tool port 110.

Figure 2A:
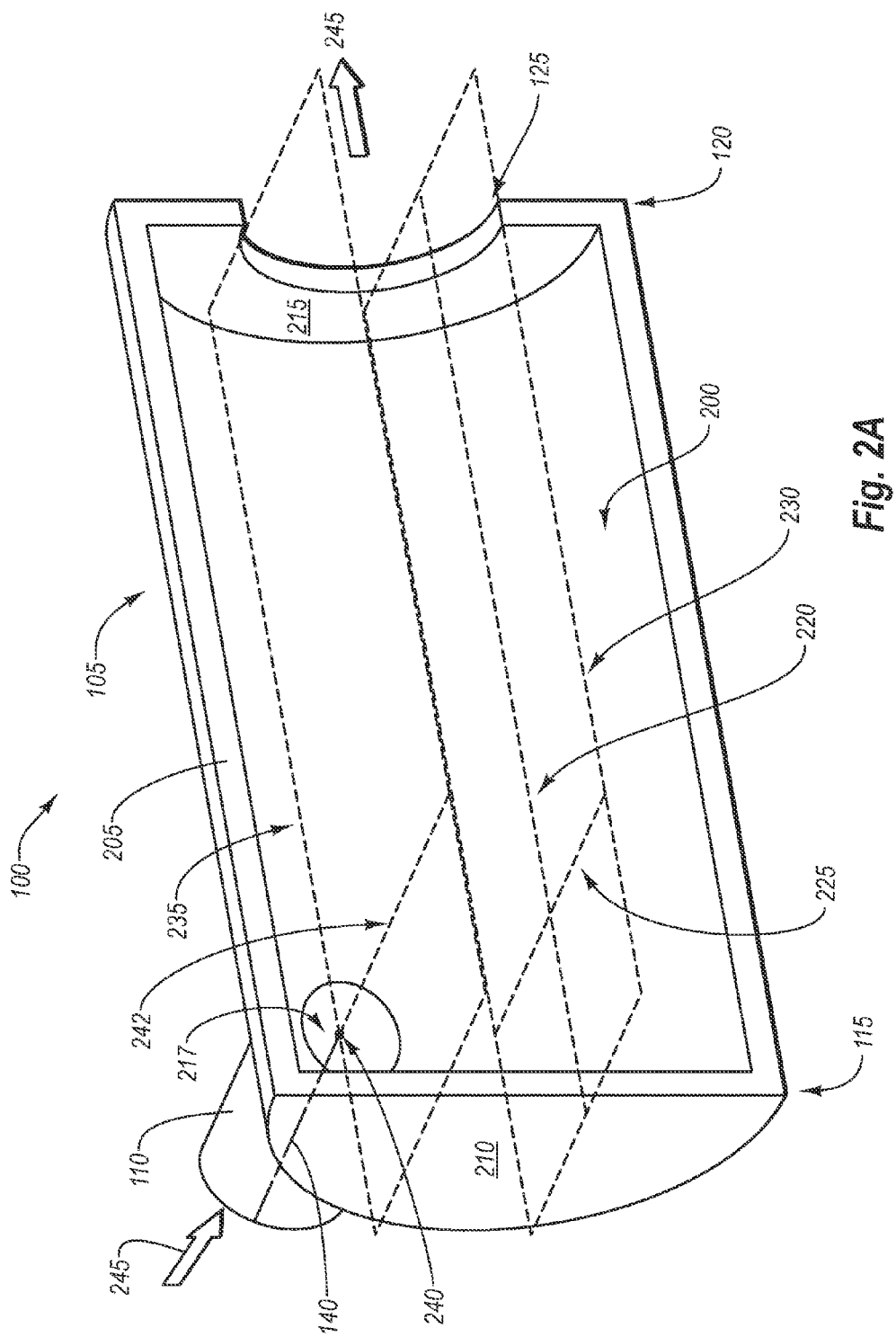
FIG. 2A illustrates a cross-sectional view of a noise reducing device according to one example.

FIG. 2A illustrates a partial cross-sectional view of the noise reducing device 100 taken along section 2A-2A in FIG. 1. As further illustrated in FIG. 2A, the housing 105 may define an open-space therein to thereby form an expansion chamber 200. In particular, the housing 105 may include a main body 205 at least partially between the first end 115 and the second end 120 that defines a perimeter of the expansion chamber 200. Further, the first end 115 in the illustrated example terminates in a first end wall 210 while the second end 120 may terminate in a second end wall 215. A port outlet 217 is formed in the main body 205 to provide fluid communication between the tool port 110 and the expansion chamber 200.

The first and second end walls 210, 215 may have any characteristic that helps the noise reducing device to reduce noise from a pneumatic tool. The first and second end walls 210, 215 may have any shape, including, but not limited to, a substantially planar shape, a convex shape, a concave shape, a conical, other shapes, or any combination of shapes. For example, FIG. 2A shows the noise reducing device 100 may include first and second end walls 210, 215 that are substantially planar. Further in the illustrated example, the outlet 125 includes a single opening defined in the second end wall 215. In other examples, any number of openings of any size or combination of sizes may be defined in the second end wall, 215, the first end wall 210 and/or the main body 205. In at least one example, the opening or openings that form the outlet 125 have a smaller diameter than the diameter of the expansion chamber 200. Further, in other examples that have non-circular cross sectional shapes, the openings that form the outlet may have a major dimension, which may be described as the largest cross distance in a cross sectional portion, that is smaller than a corresponding major dimension of the expansion chamber 200.

The resulting expansion chamber 200 formed in the illustrated example has a generally cylindrical shape. It will be appreciated that the expansion chamber 200 may have any shape that may help exhaust introduced from the tool port 110 to whirl within the expansion chamber 200 and create an at least partial vortex. Such shapes may include, without limitation, kidney-shaped, rectangular, square, round, conical, ellipsoidal, tubular, conical, polygonal, other shapes or any combination of shapes.

Figure 2B:
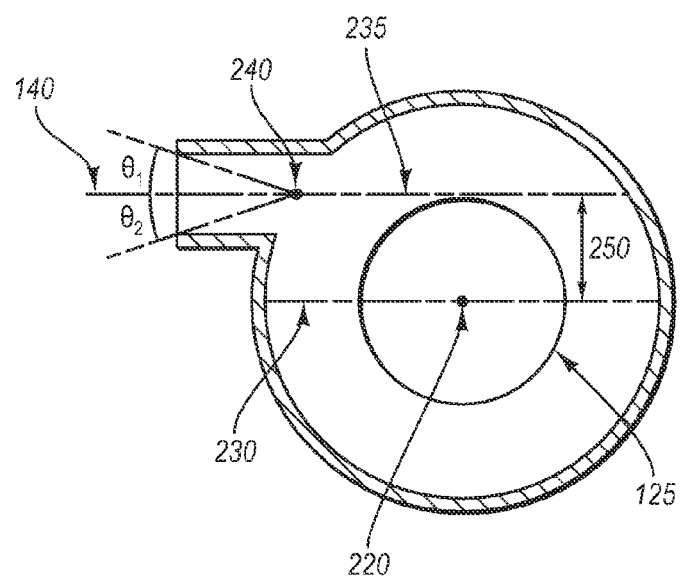
FIG. 2B illustrates a cross-sectional view of a noise reducing device according to one example.
Figure 2C:
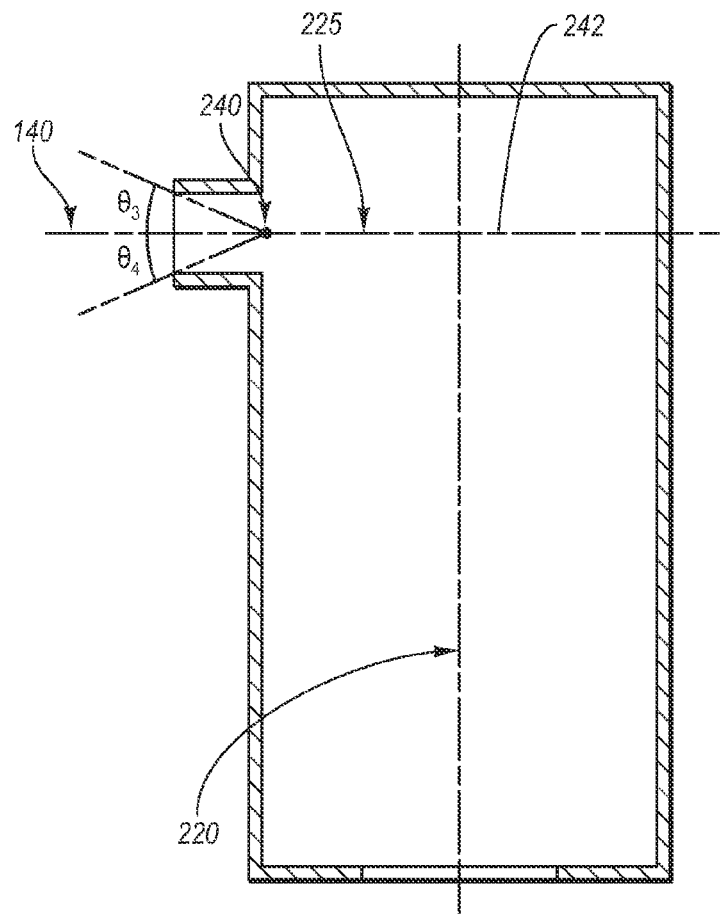
FIG. 2C illustrates a cross-sectional view of a noise reducing device according to one example.

Regardless of the configuration, the expansion chamber 200 may further be described with reference to a longitudinal axis 220. As illustrated in FIGS. 2A, 2B, and 2C, the longitudinal axis 220 extends through a center of the housing 205. A transverse axis 225 may be referenced which is generally perpendicular to the longitudinal axis 220. The longitudinal axis 220 and the transverse axis 225 form a first reference plane 230.

The orientation of the first reference plane 230 may be described with reference to a second reference plane 235, which in turn may be described with reference to the tool port 110. In particular, the second reference plane 235 is parallel to the first reference plane 230. Further, the second reference plane 235 intersects or includes the port axis 140 at the port outlet 217. The point on the port axis 140 at the port outlet 217 that is contained by the second reference plane 235 may be described as a port outlet point 240. An offset distance 250 (FIG. 2B) between the first reference plane 230 and the second reference plane 235 causes the port outlet point 240 to be offset from the first reference plane 230. The port outlet point 240 also constrains a location of a second transverse axis 242 in that the port outlet point 240 is collinear with the second transverse axis 242. The second transverse axis 242 may further be described as being both 1) parallel to the first transverse axis 225 and being coplanar with the second reference plane 235.

The port axis 140 may have any orientation relative to the port outlet point 240. Some orientations include orientations that help direct exhaust from the tool port 110 to the expansion chamber 200 in a manner that causes the exhaust to whirl around the at least a portion of the main body 205 as the exhaust enters the expansion chamber 200. In the example illustrated in FIG. 2, the port axis 140 may be generally co-linear with the second transverse axis 225. In other examples, the port axis 140 may be oriented at an angle relative to the second transverse axis 225. In particular, the port axis 140 may be oriented at an angle with respect to the second reference plane 235 and/or a plane including the first transverse axis 225 and the second transverse axis 242.

For example, FIG. 2B illustrates another cross-sectional view of the noise reducing device 100 taken along section 2B-2B of FIG. 1. As illustrated in FIG. 2B, port axis 140 may be coplanar with the second reference plane 235. As illustrated in FIG. 2B, the first reference plane 230 and the second reference plane 235 may be separated by an offset distance 250. A ratio of the offset distance 250 to the diameter of the expansion chamber 200 may have a value greater than 0 and less than 0.5. Similar ratios may also exist in devices in which the housing 105 and/or the expansion chamber 200 have a non-circular cross section. Additionally, the offset distance 250 may also have a value that is not related to the diameter or other width or height dimension.

Further, the port axis 140 may be oriented an angle relative to the second reference plane 235, as indicated by dashed lines and angles $\theta_1$ (theta sub1) and $\theta_2$ (theta sub2). The values of $\theta_1$ (theta sub1) may be between about 0 degrees and about 80 degrees, while the values of $\theta_2$ (theta sub2) may be between about 0 degrees and about 80 degrees.

Similarly, the port axis 140 may be oriented at an angle relative to a plane containing the first transverse axis 225 and the second transverse axis 242. In particular, FIG. 2C illustrates a partial cross sectional view of the noise reducing device 100 taken along the second reference plane 235. As illustrated in FIG. 2C, the port axis 140 may be oriented at either an angle $\theta_3$ (theta sub3) or $\theta_4$ (theta sub4) relative to the transverse axis 225. Angle $\theta_3$ (theta sub3) may vary between about 0 degrees and about 60 degrees while $\theta_4$ (theta sub4) may vary between about 0 degrees and about 60 degrees. Further, while the angles shown in FIGS. 2B and 2C are shown in isolation, it will be appreciated that port axis 140 may be oriented at any angle relative to either or both of the planes described above to direct exhaust to the expansion chamber 200 in such a manner as to cause the exhaust to whirl or eddy as it is introduced to the expansion chamber 200.

As previously discussed, the tool port 240 is in fluid communication with the expansion chamber 200 in such a manner as to cause exhaust from a pneumatic tool to whirl or eddy as the exhaust enters the expansion chamber 200. The exhaust is illustrated schematically and collectively as an exhaust stream 245 from a pneumatic percussive tool (or pneumatic tool) that enters the expansion chamber 200. The exhaust stream 245 then eddies through the expansion chamber 200. The exhaust may also be at least partially reflected off the first and second end walls 210, 215 exhausted from the expansion chamber 200 through the outlet 125.

The chamber 200 may be any size suitable for use with a pneumatic tool. For example, the chamber may be as long as about 3 m or as short as about 5 mm. In another example, however, the chamber may have a length between about 120 mm and about 250 mm. Nevertheless, the skilled artisan will recognize that the length of the chamber may be longer or shorter depending on the type of pneumatic tool with which the noise reducing device 100 is used.

The chamber 200 may have any height, width, and/or diameter suitable for reducing the noise from a pneumatic tool. For example, where the chamber 200 has a substantially circular cross section, the diameter of the chamber may range from about 5 mm to about 1 m. In another example, however, the chamber may have a diameter between about 40 mm and about 60 mm. However, it will be appreciated that the expansion chamber 200 may be sized as desired for using with any of a number pneumatic tools.

The various components of the noise reducing device 100 may be formed in any manner and thence joined or coupled in any manner. For example, the first end 130 of the tool port 110 may be adapted so that it can be coupled to any desired pneumatic tool as known in the art, including by welding, bonding, or fastening. Moreover, in some instances, the noise reducing device may be configured to be selectively coupled to and uncoupled from a pneumatic tool, as desired.

As introduced, the second end 135 of the tool port 110 is in fluid communication with the expansion chamber 200. In at least one example, such as the example illustrated in FIG. 2, the tool port 110 may terminate at the intersection of the main body 205 and the tool port 110. In other examples, the tool port 110 may extend through the main body 205 and into the chamber 200. The second end 135 of the tool port 110 may be coupled to the housing 105 through any method, including, but not limited to, welding, bonding, or fastening. In at least one example, the tool port 110 may be in airtight fluid communication with the housing 105.

The tool port 110 may be coupled to the noise reducing device 100 in any location that allows the exhaust to spin through the expansion chamber 200 and create a vortex before exiting that chamber. In some embodiments, the tool port 110 may be coupled to an end wall (e.g., 210 or 215) or to the housing 105, as shown in FIG. 1. When the tool port 110 is coupled to the housing 105, the outlet 125 may be disposed at any position that allows exhaust from the pneumatic tool to whirl through the chamber and create a vortex. Accordingly, the tool port 110 may be located adjacent the first end 115 or the second end 120 as well as anywhere in between. For example, FIG. 1 shows that where the outlet 125 is located in the second end wall 215, the tool port 110 may be located near the first end wall 210. Such a configuration may maximize the length traveled by the exhaust before the exhaust exits the noise reducing device 100, which may in turn maximize the noise reduction.

The noise reducing device 100 may be constructed of any material suitable for a noise reducing device with the traits described herein. Thus, the noise reducing device can be made of one or more metals, metal alloys, composite materials, polymers, elastomers, ceramics, or any combination thereof.

The various components of the noise reducing device 100 can be made using any process. These processes may include, without limitation hydro-forming, stamping, punching, laser cutting, molding, or any other known method. For example, the elements of the noise reducing device may be cut using any of the above processes. The desired features in the elements may then be formed, i.e., the port outlet 217 may be cut in the second end wall 215 or other desired location(s), a hole for the tool port 110 may be cut into the main body 205 of the housing 105, and the tool port 110 may be cut to length, formed, and fitted with any necessary adapter so it can be coupled to a pneumatic tool.

Once all the elements of the noise reducing device 100 have been prepared, they may be joined together in their respective orientations. For example, the tool port 110 may be secured to the housing 105 at a desired location and be coupled to the housing 105 through any air-tight sealing method.

As shown in FIG. 2A, the exhaust 100 from a pneumatic tool (e.g., a pneumatic percussive drill) may enter the tool port 110 near the first end 115 of the device. The exhaust stream 245 may then flow through the tool port 110 so as to be introduced into the expansion chamber 200 transverse to the longitudinal axis 220. As the exhaust stream enters the expansion chamber 200, the exhaust is allowed to expand. As the exhaust is forced into the expansion chamber 200 at an oblique angle, the exhaust may move around the walls of the expansion chamber 200 to create an at least partial vortex. The exhaust may continue to circulate and mix as it flows through the length of the chamber. Additionally, as the exhaust circulates through the chamber it may be reflected off the end walls. Then, as the exhaust continues to expand and as more exhaust is introduced into the expansion chamber 200, the exhaust within the expansion chamber 200 is forced to exit through the outlet port 125 in the second end wall 215, as shown by arrow 245.

The noise reducing device combines dissipative and reactive elements that effectively reduce the noise while remaining compact in size. The sudden exhaust of air at a pressure above atmospheric pressure results in an incoherent set of sound waves with various amplitudes and frequencies. On exiting the tool port 110, the exhaust expands and impinges on the inner surfaces of the expansion chamber 200, where it is reflected and deflected. This action may result in a pressure and noise reduction. The path for the exhaust is along the length of the noise reducing device in the general direction of the outlet 125. The exhaust spins and creates a vortex through the length of the chamber and expands into the available volume. The exhaust may circulate, mix, and change the direction of the circulating flow, which may result in pressure and/or noise reduction, which may result in noise dissipation and thus overall noise reduction. The outlet 125 is positioned such that when the exhaust 245 contacts the end walls it may be reflected, which may also reduce the noise (reactive noise reducing). The exhaust 245 finally vents through the outlet port to atmosphere. The spinning and mixing motion of the exhaust may reduce the directionality of the remaining noise and cause the noise to be effectively dispersed to atmosphere.

Figure 3:
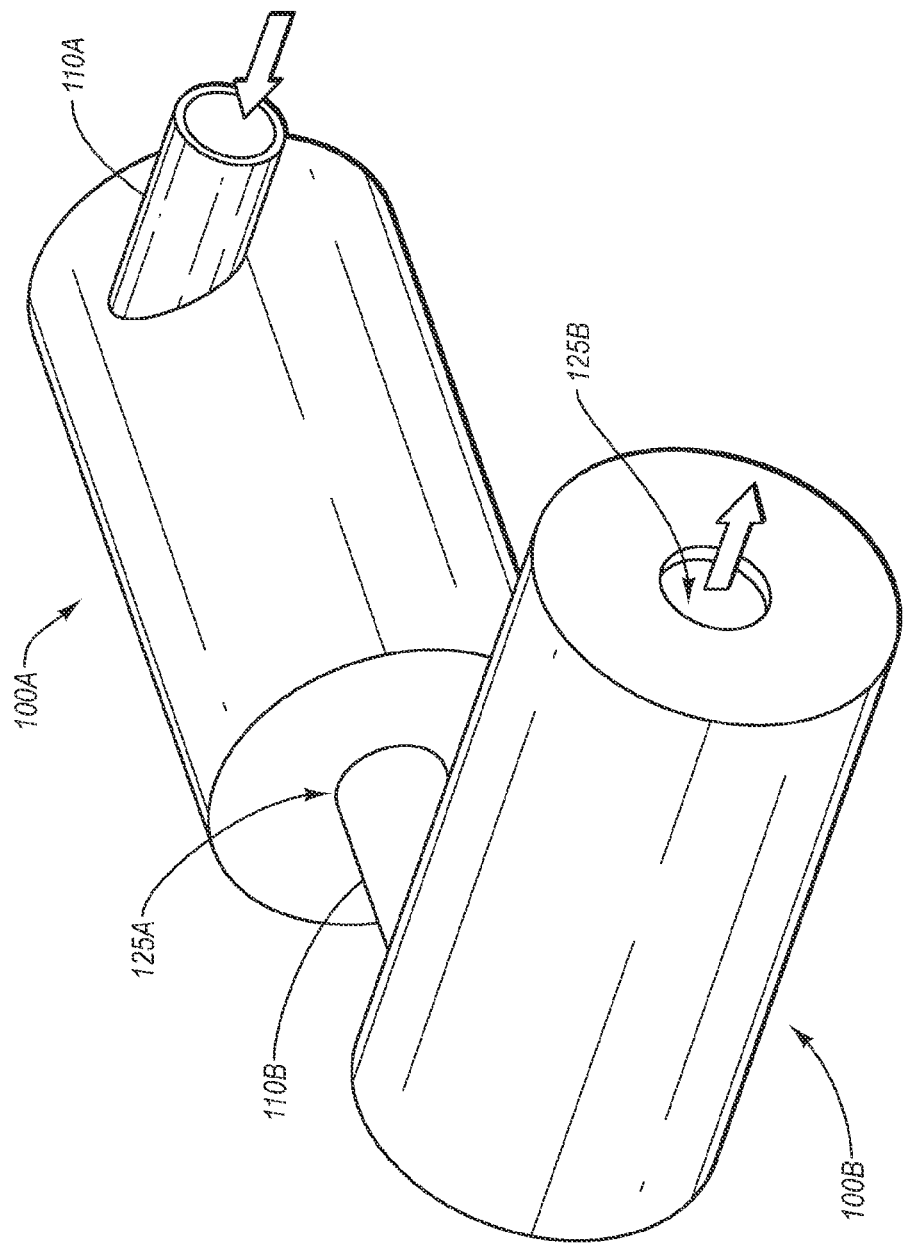
FIG. 3 illustrates a perspective view of noise reducing devices aligned in series according to one example.

The noise reducing device 100 may be used with any other known apparatus as part of a noise reducing system. In some embodiments, multiple noise reducing devices 100 may be used together in series to reduce the noise of a pneumatic tool. For example, as illustrated in FIG. 3, first and second noise reducing devices 100A, 100B may be used in series as part of a noise reducing system. In this example, a pneumatic tool may be coupled to noise reducing device 100A by way of a tool port 110A. In turn, an outlet 125A of the first noise reducing device 100A may be coupled to the second noise reducing device 100B via a tool port 110B.

Figure 4:
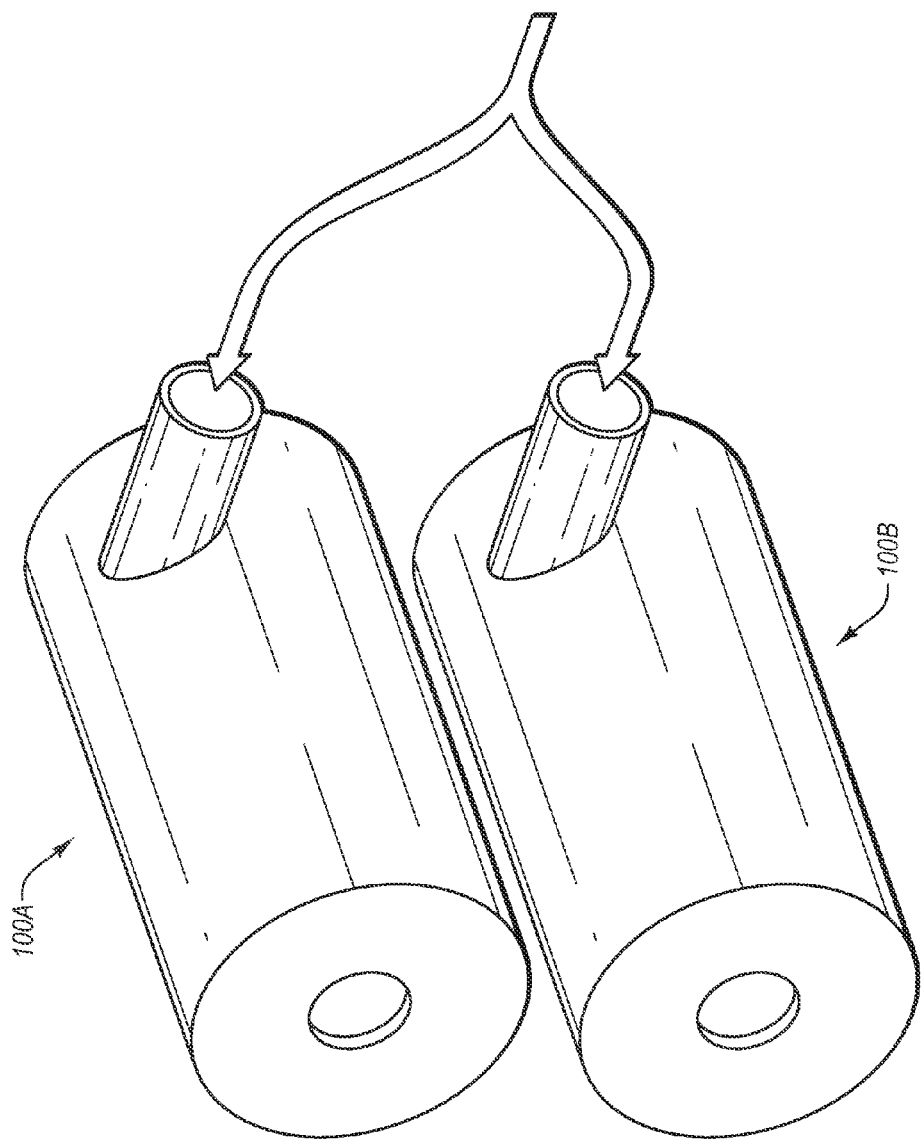
FIG. 4 illustrates a perspective view of noise reducing devices aligned in parallel according to one example.

In another example, as illustrated in FIG. 4 two (or more) noise reducing devices, such as first and second noise reducing devices 100A, 100B may be used together as part of a noise reducing system to reduce noise from a pneumatic tool in a parallel configuration. In these embodiments, exhaust from a pneumatic tool may be separated into separate exhaust streams to the inlet ports of two separate noise reducing devices. Where the inlet ports on the two noise reducing devices are coupled at oblique angles to the two the chambers of the devices, exhaust may spin through and create an at least partial vortex in each chamber.

In other examples, the outlet ports of each of the two devices may be coupled to a third noise reducing device (via inlet ports that are coupled at oblique angles to the chamber of the third noise reducing device. In this manner, vortices created in the first two noise reducing devices may be combined to create a vortex in the third device. After passing through the chamber of the third device, the exhaust may then exit to atmosphere. Accordingly, noise reducing systems may include any number of noise reducing devices in series and/or parallel configurations.

Figure 5:
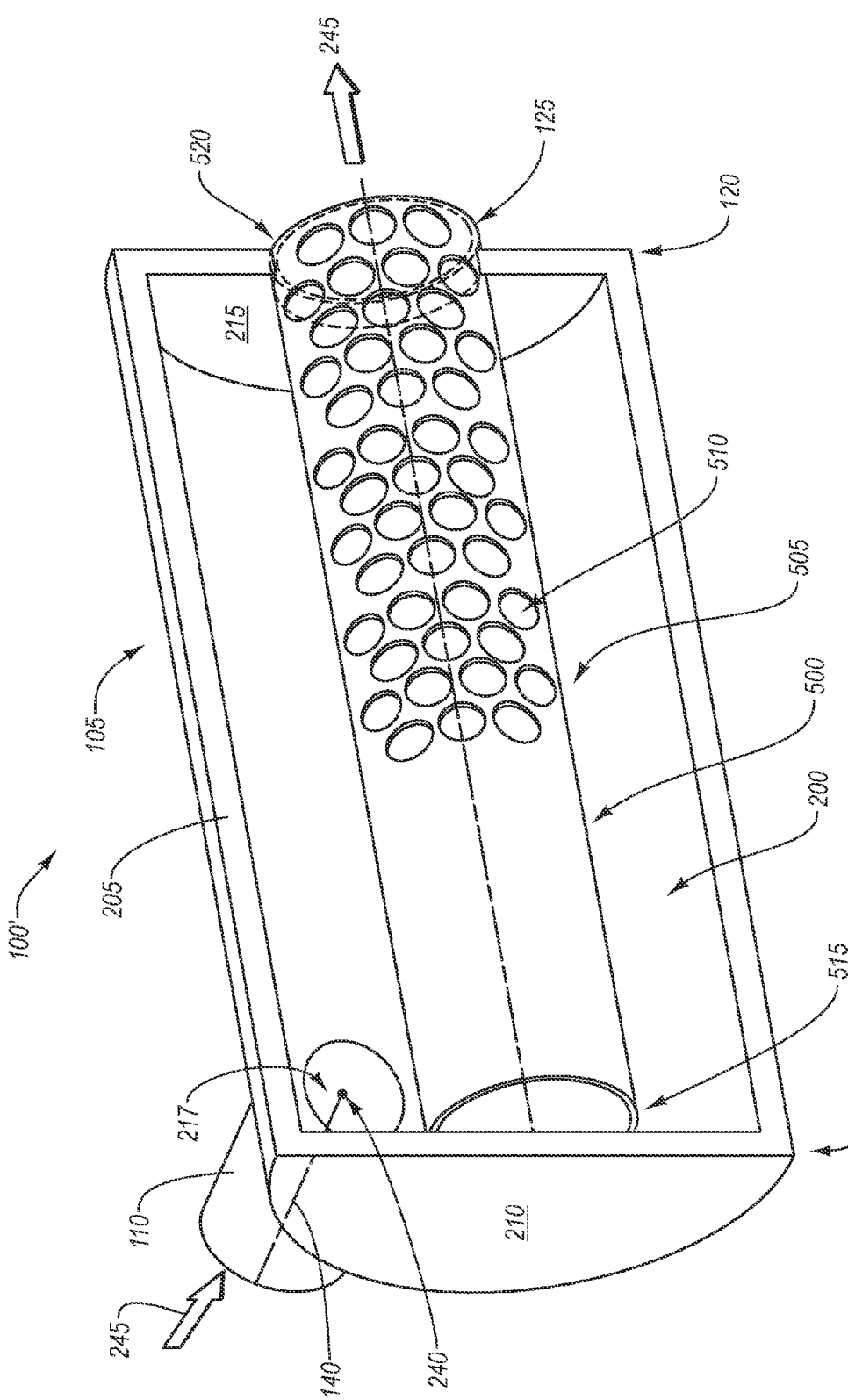
FIG. 5 illustrates a partial perspective view of a noise reducing device that includes a perforated tube according to one example.

FIG. 5 illustrates a noise reducing device 100' that includes a perforated tube 500. The perforated tube 500 may have any characteristic that allows the noise reducing device 100' to reduce noise produced by a pneumatic tool. In the illustrated example, the perforated tube 500 includes a perforated section 505 having holes or perforations 510 defined therein. The perforated section 505 may comprise any suitable number of holes 510, depending on the desired pressure drop, exhaust flow, and/or noise level. The holes 510 may have any shape, including shapes that can be drilled, machined, laser-cut, or eroded. These shapes may further include circular, square, polygonal, irregular shapes and/or any combination of shapes. Further, the perforated tube 500 may be any size (e.g., length, width, height, diameter, etc.) suitable for use with the noise reducing device.

The example illustrates shows that the perforated tube 500 may be disposed near the longitudinal axis 220 of the expansion chamber 200. In particular, the perforated tube 500 may include a first end 515 and a second end 520. The first end 515 of the perforated tube may be joined to the first end 115 of the housing 105. For example, the first end 515 may be secured to the first end wall 210 in any suitable manner. The second end 520 is joined to the second end wall 215 adjacent or at the outlet 125. In at least one example, the second end 520 may be sealingly joined to the second end wall 215 adjacent or at the outlet 125. While the perforated tube 500 is illustrated as being secured to the first end wall 210 and extending to the second end wall 215, it will be appreciated that the first end 515 of the perforated tube may also end short of the first end wall 210 or may extend away first end wall 210 and end short of the second end wall 215.

Further, the perforated section 505 may comprise only a portion of the perforated tube 500, such that other portions of the perforated tube 500 are not perforated.

In still other examples, noise reducing devices 100' that include perforated tubes 500 may be joined in series in a similar manner as described above with reference to FIG. 3 or in parallel in a similar manner as described above with reference to FIG. 4. Further, it will be appreciated that in some examples, the perforated tube 500 may be coupled to a tool port of another noise reducing device.

Accordingly, the noise reducing device may reduce noise better than may some conventional noise reducing devices. The noise reducing device may also be simpler in construction and compact in size. Additionally, as described above, the spinning motion may also reduce the directionality of noise that exits the outlet port, and thereby, cause the noise to disperse more effectively. Similarly, because the outlet port may be relatively large, the noise reducing device may not impede the flow of exhaust so as to noticeably reduce the performance of the pneumatic tool. The noise reducing device may be embodied in other specific forms without departing from the spirit or essential characteristics of this application. The described embodiments are to be considered in all respects only as illustrative and not restrictive. The scope of the application is, therefore, indicated by the appended claims rather than by the foregoing description. All changes that come within the meaning and range of equivalency of the claims are to be embraced within their scope.

What is claimed is:

1. A noise reducing device for a pneumatic tool, comprising:

a single expansion chamber having a first end, an opposing second end, an outlet formed in the second end, and a longitudinal axis along the length thereof between the first and second ends of the expansion chamber;

a tool port coupled to and in fluid communication with the expansion chamber, the tool port being located between the first and second ends of the expansion chamber and being oriented transverse to the longitudinal axis of the expansion chamber in such a manner as to cause fluid entering the expansion chamber from the tool port to whirl within the expansion chamber; and a tube located within the expansion chamber, the tube having a length extending along the longitudinal axis of the expansion chamber from the first end to the second end of the expansion chamber, the tube having a non-perforated portion and a perforated portion, wherein the non-perforated portion of the tube extends from the first end of the expansion chamber past the tool port, and wherein the non-perforated portion of the tube comprises a minority of the length of the tube.

2. The noise reducing device of claim 1, wherein the tool port is offset relative the longitudinal axis.

3. The noise reducing device of claim 1, wherein the outlet is concentric to the longitudinal axis of the expansion chamber.

4. The noise reducing device of claim 1, wherein the tube is sealed about the outlet.

5. A noise reducing device for a pneumatic tool, comprising:

an expansion chamber defined by a first end, an opposing second end, and a body between the first and second ends, wherein the expansion chamber has a longitudinal axis located near a center of the expansion chamber and extending from the first end to the second end of the expansion chamber;

a tube extending within the expansion chamber from the first end to the second end of the expansion chamber, the tube having a non-perforated portion, a perforated portion, and an exhaust outlet, wherein perforated portion of the tube is disposed toward the exhaust outlet and comprises a first perforation a first distance from the second end of the expansion chamber and at least a second perforation a second distance from the second end of the expansion chamber, wherein the first distance differs from the second distance, and the wherein the exhaust outlet is positioned in the second end of the expansion chamber; and a tool port coupled to the body of the expansion chamber between the first and second ends, wherein the tool port is positioned closer to the first end than the second end of the expansion chamber, the tool port extending at least partially through the body of the expansion chamber so as to be positioned between the first and second ends of the expansion chamber, the tool port being in fluid communication with the expansion chamber;

wherein fluid directed from the tool port into the expansion chamber is caused to whirl within the expansion chamber around the tube, through one or more of the first and at least a second perforations, and out the exhaust outlet.

6. The device of claim 5, wherein the expansion chamber includes a first end wall and a second end wall and wherein the exhaust outlet is at least partially defined in the second end wall, the exhaust outlet having a smaller major dimension than a corresponding major dimension of the expansion chamber.

7. The device of claim 6, wherein the longitudinal axis of the expansion chamber passes through at least a portion of an opening forming the exhaust outlet.

8. The device of claim 5, wherein the expansion chamber is generally cylindrical in shape.

9. The device of claim 5, wherein the tool port is offset from the longitudinal axis of the expansion chamber.

10. The device of claim 9, wherein the tool port is offset from the longitudinal axis of the expansion chamber by an offset distance, wherein the ratio of the offset distance to a cross-sectional diameter of the expansion chamber is greater than 0 and less than 0.5.

11. The device of claim 5, wherein the tool port is oriented transverse to the longitudinal axis of the expansion chamber.

12. The device of claim 5, wherein the tool port is oriented transverse to the exhaust outlet.

13. The device of claim 5, wherein the non-perforated portion of the tube extends from the first end of the expansion chamber past the tool port.

14. The device of claim 5, wherein the perforated tube is concentric to the longitudinal axis of the expansion chamber.

15. The device of claim 6, wherein the perforated tube is sealingly coupled to the second end wall.

16. The device of claim 15, wherein the perforated tube is sealingly coupled to the first end wall.

17. A noise reducing system for a pneumatic tool, comprising:

at least one noise reducing device fluidly coupled to the pneumatic tool, the noise reducing device including:

an expansion chamber defined by a first end wall, an opposing second end wall, and a body between the first and second end walls, wherein the expansion chamber has a longitudinal axis located near a center of the expansion chamber and extending along a length of the expansion chamber;

a tool port extending into the body of the expansion chamber, the tool port being oriented transverse to and offset from the longitudinal axis of the expansion chamber;

an outlet positioned within the second end wall of the expansion chamber, the outlet being concentric to the longitudinal axis of the expansion chamber; and a tube located within the expansion chamber and secured about the outlet, the tube including a perforated portion and a non-perforated portion, wherein the perforated portion of the tube is located proximate the outlet and extends along at least half of the length of the tube.

18. The system of claim 17, further comprising a first noise reducing device and a second noise reducing, the outlet of the first noise reducing device being in fluid communication with the tool port of the second noise reducing device.

19. The system of claim 17, further comprising a first noise reducing device and a second noise reducing device, the first noise reducing device and the second noise reducing device being arranged in parallel such that an exhaust stream from a pneumatic tool is split between the first noise reducing device and the second noise reducing device.

20. A method for reducing the noise emitted from a pneumatic tool, comprising:

directing an exhaust stream from the pneumatic tool through a tool port into a first end of a noise reducing device; and causing the exhaust stream to whirl within an expansion chamber around a non-perforated portion of a tube extending from the first end of the expansion chamber past the tool port, around a perforated portion of the tube comprising a first perforation a first distance from a second end of the expansion chamber and at least a second perforation a second distance from the second end of the expansion chamber, through one or more of the first and at least a second perforations, and out of an exhaust outlet;

wherein the first distance differs from the second distance.

21. The method of claim 20, wherein directing the exhaust stream through the tool port comprises directing the exhaust stream through a tool port oriented transverse to and offset from a longitudinal axis of the expansion chamber.

22. The method of claim 21, further including directing the exhaust stream of the noise reducing device to a second noise reducing device.

23. The method of claim 21, further including splitting the exhaust stream between the noise reducing device and a second noise reducing device.

* * * * *